United States Patent
Wang et al.

(10) Patent No.: US 9,250,394 B2
(45) Date of Patent: Feb. 2, 2016

(54) CONNECTOR FOR RIBBON OPTICAL FIBER

(75) Inventors: Qiyue Wang, Guangdong (CN); Zhen Zhou, Guangdong (CN)

(73) Assignee: SUNSEA Telecommunications Co., Ltd., Shenzhen, Guangdong (CN)

( * ) Notice: Subject to any disclaimer, the term of this patent is extended or adjusted under 35 U.S.C. 154(b) by 180 days.

(21) Appl. No.: 13/989,565

(22) PCT Filed: Dec. 31, 2010

(86) PCT No.: PCT/CN2010/080661
§ 371 (c)(1),
(2), (4) Date: May 24, 2013

(87) PCT Pub. No.: WO2012/088723
PCT Pub. Date: Jul. 5, 2012

(65) Prior Publication Data
US 2013/0251310 A1 Sep. 26, 2013

(51) Int. Cl.
*G02B 6/38* (2006.01)
*G02B 6/36* (2006.01)

(52) U.S. Cl.
CPC ............ *G02B 6/3869* (2013.01); *G02B 6/3858* (2013.01); *G02B 6/3885* (2013.01); *G02B 6/387* (2013.01); *G02B 6/3839* (2013.01)

(58) Field of Classification Search
CPC .. G02B 6/3885; G02B 6/3825; G02B 6/3887; G02B 6/387; G02B 6/3839
USPC ........... 385/53, 55, 59, 60, 63, 65, 71, 72, 78, 385/83, 92, 98
See application file for complete search history.

(56) References Cited

U.S. PATENT DOCUMENTS

| | | | |
|---|---|---|---|
| 4,889,399 A * | 12/1989 | Mariani et al. | 385/35 |
| 5,199,093 A | 3/1993 | Longhurst | |
| 5,430,819 A * | 7/1995 | Sizer et al. | 385/59 |
| 5,790,733 A * | 8/1998 | Smith et al. | 385/88 |
| 6,352,372 B1 * | 3/2002 | Shahid | 385/59 |
| 2008/0013891 A1 * | 1/2008 | Nishioka et al. | 385/59 |

(Continued)

FOREIGN PATENT DOCUMENTS

| | | |
|---|---|---|
| CN | 1220015 | 6/1999 |
| CN | 1499232 | 5/2004 |

(Continued)

OTHER PUBLICATIONS

International Search Report for PCT/CN2010/080661, mailed Oct. 13, 2011.

(Continued)

*Primary Examiner* — Kaveh C Kianni
*Assistant Examiner* — Hung Lam
(74) *Attorney, Agent, or Firm* — Nixon & Vanderhye P.C.

(57) ABSTRACT

A connector for ribbon optical fiber comprises a plug (1) and a socket (2). The plug (1) movably connects with the socket (2) through buttons (106) which are set on the both sides of the front end of the plug, and an alignment core (12) which allows a ribbon optical fiber movably aligning in the inside movement is also set on the front end of the plug (1). In the connector for ribbon optical fiber of present invention, the plug (1) movably connects with the socket (2) through buttons (106), therefore repeated plugging and pulling can be achieved, and the optical fiber movably aligns inside the alignment core with the advantages of simple structure and good effect of alignment.

23 Claims, 5 Drawing Sheets

(56) References Cited

U.S. PATENT DOCUMENTS

2009/0097799 A1* 4/2009 Sakurai et al. .................. 385/60
2010/0266245 A1 10/2010 Sabo

FOREIGN PATENT DOCUMENTS

| | | |
|---|---|---|
| CN | 101866036 | 10/2010 |
| EP | 0969298 A1 | 1/2000 |
| EP | 1004912 | 5/2000 |
| JP | 62-269108 | 11/1987 |
| JP | 2001-208938 | 8/2001 |
| JP | 2002-273645 | 9/2002 |
| JP | 2004-126400 | 4/2004 |
| JP | 2005-77839 | 3/2005 |
| JP | 2007-279415 | 10/2007 |
| JP | 2009-92882 | 4/2009 |
| WO | WO 97/46901 A1 | 11/1997 |

OTHER PUBLICATIONS

Extended European Search Report issued in corresponding European Patent Application No. 10861497 dated May 28, 2014.

Office Action issued in corresponding Japanese Patent Application No. 2013-545007 dated Apr. 26, 2014.

\* cited by examiner

CONNECTOR FOR RIBBON OPTICAL FIBER

This application is the U.S. national phase of International Application No. PCT/CN2010/080661, filed 31 Dec. 2010, which designated the U.S., the entire contents of which is hereby incorporated by reference.

TECHNICAL FIELD

The present application relates to a physical connection technology in the optical communication field, and more particularly, to a connector for ribbon optical fiber cable.

TECHNICAL BACKGROUND

The ribbon optical fiber cable has been increasingly applied due to its capability of providing multiple optical paths. Generally, the connection between the ribbon optical fiber cables is much more complex than that between optical fiber cables each with a single optical fiber, because each optical fiber of the ribbon optical fiber cable must be inserted into the corresponding hole or channel of the prefabricated connector. However, it is difficult to insert each bare optical fiber into the corresponding hole or channel due to the extremely small size and the brittle nature of the bare optical fiber, and the connection of the ribbon optical fiber cable must be reconstructed if any of the optical fibers is broken. Therefore, the nature of the ribbon optical fiber cable results in the complex structure and a relatively high defective rate of the existing connector for ribbon optical fiber cable, which limits the application of the ribbon optical fiber cable to a certain extent.

SUMMARY OF THE INVENTION

The problem to be resolved by the application is to provide a connector for ribbon optical fiber cable in view of the above defects of connecting the ribbon optical fiber cables in the prior art.

In order to achieve above purpose, the application proposes a technical solution of a connector for ribbon optical fiber cable, which includes a plug and a receptacle, wherein, the plug is detachably connected to the receptacle through hooked tabs provided on both lateral sides of a front end of the plug, and a centering body which allows a ribbon optical fiber cable to be movably centered inside the centering body is provided at the front end of the plug.

In the connector for ribbon optical fiber cable of the present application, the plug includes: a plug casing; and a first fiber fixation assembly and the centering body accommodated in the plug casing, where the centering body is provided with multiple centering channels; where a centering body accommodating cavity for receiving the centering body is provided at a front end of the plug casing, and an opening facing the centering body is provided at a front end face of the plug casing; a first ribbon optical fiber cable is allowed to be inserted into the plug casing from a tail end of the plug casing and fixed by the first fiber fixation assembly, a sleeve of an end of the first ribbon optical fiber cable is stripped off to expose multiple first bare fibers, and each of the first bare fibers is inserted into a corresponding one of the centering channels; the receptacle includes a receptacle casing and a second fiber fixation assembly accommodated in the receptacle casing; a second ribbon optical fiber cable is allowed to be inserted into the receptacle casing from a tail end of the receptacle casing and fixed by the second fiber fixation assembly; a sleeve of an end of the second ribbon optical fiber cable is stripped off to expose multiple second bare fibers, and when the plug is inserted into the receptacle, each of the second bare fibers is inserted into a corresponding one of the centering channels, so that an end face of the first bare fiber abuts on that of the second bare fiber.

In the connector for ribbon optical fiber cable of present application, the centering body is a ceramic body, the centering channels are through holes arranged in the ceramic body, and chamfers are provided at both ends of the through holes.

In the connector for ribbon optical fiber cable of present application, the centering body includes a base with V-grooves and a cover plate with V-grooves for covering the base, multiple parallel V-shaped centering slots forming the centering channels are arranged on the base, and a chamfer is arranged on at least one end of the V-shaped centering slot.

In the connector for ribbon optical fiber cable of present application, V-shaped arranging slots are provided on the base with V-grooves, and the first bare fibers extend into the centering V-grooves through the V-shaped arranging slots.

In the connector for ribbon optical fiber cable of present application, guiding protrusions are provided on both top and bottom surfaces of the centering body, and corresponding guide slots are arranged on inner wall of the centering body accommodating cavity of the plug casing.

In the connector for ribbon optical fiber cable of present application, the first fiber fixation assembly includes an optical fiber tailstock and an outer cover plate that covers over the optical fiber tailstock, and the first ribbon optical fiber cable is pressed tightly between the optical fiber tailstock and the outer cover plate.

In the connector for ribbon optical fiber cable of present application, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

In the connector for ribbon optical fiber cable of present application, the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

In the connector for ribbon optical fiber cable of present application, the second fiber fixation assembly also includes a fiber shaping and clipping sheet, which is arranged in the receptacle casing in front of the fiber clipping plate, and is used to press the second ribbon optical fiber cable on the bottom of the receptacle casing.

In the connector for ribbon optical fiber cable of present application, V-shaped arranging slots for optical fibers are arranged at the bottom of the receptacle casing, and the second bare fiber is suspended in the receptacle casing.

The advantageous effect of the present application lies as follows. The inventive connector for ribbon optical fiber cable includes a plug and a receptacle, and a centering body containing multiple centering channels is accommodated in the front end of the plug casing.

When the plug is inserted into the receptacle, the end faces of the first bare fibers at the front end of the first ribbon optical fiber cable abut on the end faces of the second bare fibers at the front end of the second ribbon optical fiber cable in the centering channels. The connector for ribbon optical fiber cable of the present application is advantageous for its simple structure, easy usage and repeatable inserting and plugging.

BRIEF DESCRIPTION OF THE DRAWINGS

The present application will be further described in detail below with reference to the accompanying drawings and embodiments.

DETAILED DESCRIPTION OF PREFERRED EMBODIMENTS

The specific embodiments of the present application will be further explained with reference to the drawings, for better understanding of the technical features, objects, and effects of the present application.

Figure 1:
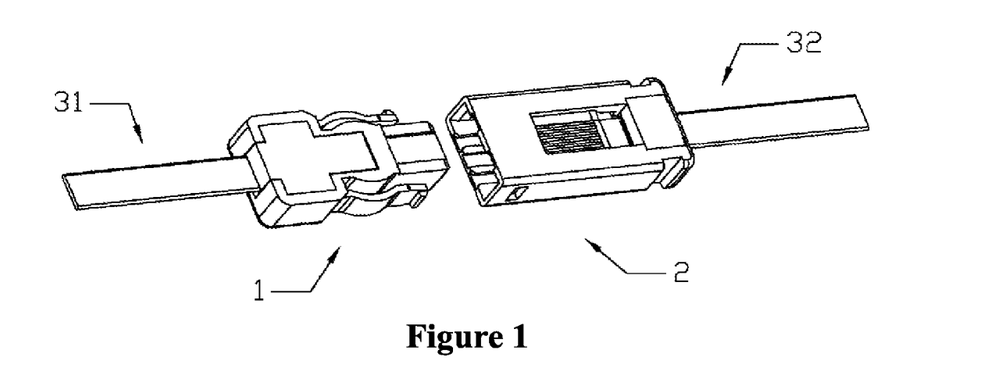
FIG. 1 is a schematic view of a connector for ribbon optical fiber cable according to a first embodiment of the present application.

FIG. 1 shows a schematic view of a connector for ribbon optical fiber cable according to a first embodiment of the present application, and the connector includes a plug 1 and a receptacle 2, the plug 1 may be repeatedly inserted into and pulled out from the receptacle 2, and the connection between a first ribbon optical fiber cable 31 and a second ribbon optical fiber cable 32 can be achieved by inserting the plug 1 into the receptacle 2.

FIGS. 2 to 6 are schematic views of the connector for ribbon optical fiber cable according to the first embodiment of the present application. The plug 1 includes a plug casing 10, and a first fiber fixation assembly 11 and a centering body 12 that are received within the casing 10. A centering body accommodating cavity 101 for receiving the centering body 12 is provided at the front end of the plug casing 10, an opening 102 facing the centering body 12 is provided at the front end face of the plug casing 10, and the centering body 12 may be fixed within the centering body accommodating cavity 101 by means of interference fitting. In the present embodiment, the centering body 12 is a ceramic body, in which multiple centering channels 121 are provided. The centering channels 121 are through holes in the ceramic body, and chamfers for guiding bare optical fibers are formed at both ends of each of the centering channels 121, to facilitate the insertion of the bare optical fibers into the centering channels 121. In order to facilitate the precise assembling of the centering body 12, guiding protrusions 122 and 123 are provided on both top and bottom surfaces of the centering body 12, and corresponding guiding slots 103 is arranged on inner walls of the centering body accommodating cavity 101. When being assembled, the guiding protrusions 122 are placed in the guide slots 103, and subsequently the centering body 12 is pushed into the centering body accommodating cavity 101.

Figure 2:
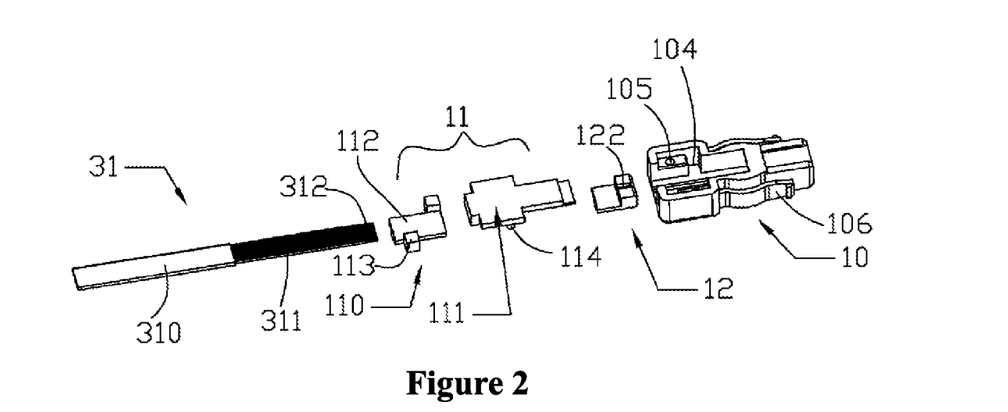
FIG. 2 is a schematic exploded view of a plug of the connector for ribbon optical fiber cable according to the first embodiment of the present application.
Figure 3:
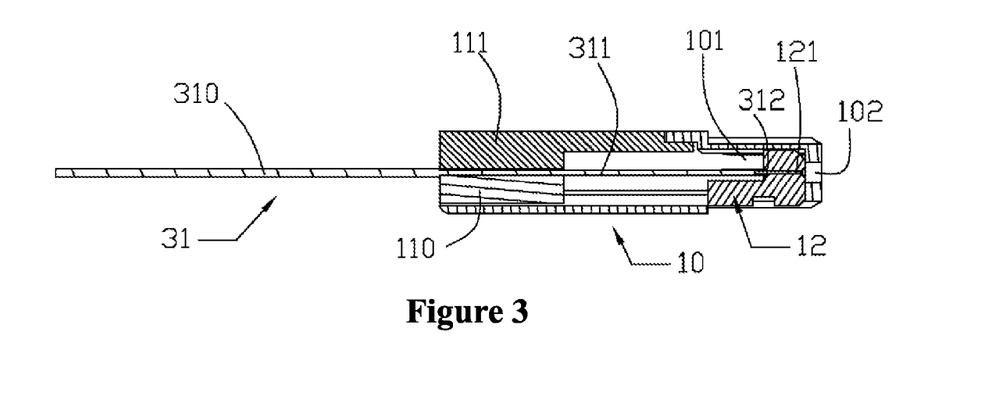
FIG. 3 is a section view of the plug of the connector for ribbon optical fiber cable according to the first embodiment of the present application.
Figure 4:
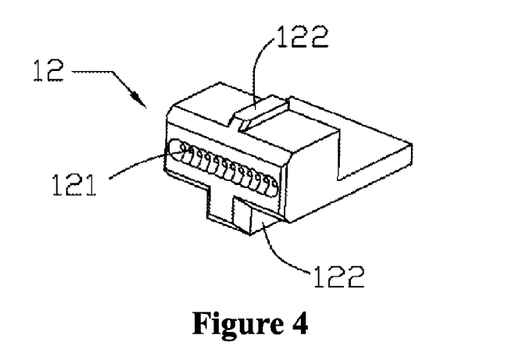
FIG. 4 is a schematic view of a centering body of the plug of the connector for ribbon optical fiber cable according to the first embodiment of the present application.
Figure 5:
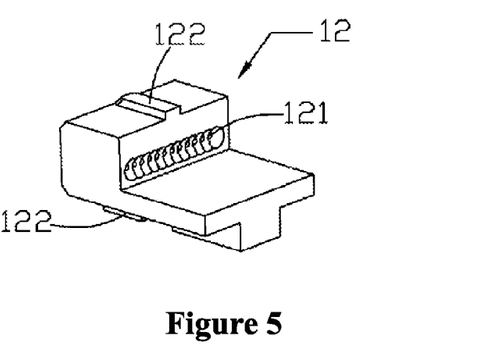
FIG. 5 is a schematic view of the centering body of FIG. 4 viewed from another perspective.
Figure 6:
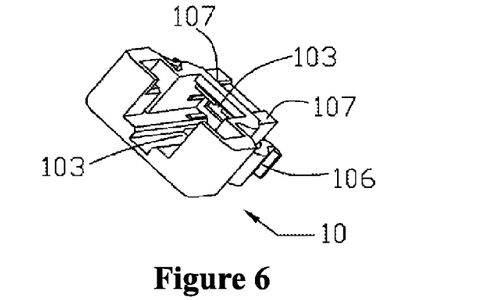
FIG. 6 is a schematic view of the plug casing of the connector for ribbon optical fiber cable according to the first embodiment of the present application.

The first ribbon optical fiber cable 31 may be inserted into the plug casing 10 from the tail end of the plug 1, and may include a cladding section 310 with cladding, a sleeve section 311 where the cladding is stripped off, and a first bare fiber section 312 where the sleeve is stripped off. The diameter of each optical fiber in the sleeve section 311 is 250 micron (nm), the diameter of each bare fiber in the first bare fiber section 312 is 125 micron, and the first bare fiber section 312 (i.e. the head of the first ribbon optical fiber cable 31) contains multiple first bare fibers. The sleeve section 311 of the first ribbon optical fiber cable 31 is fixed in the plug casing 10 by the first fiber fixation assembly 11, which includes an optical fiber tailstock 110 and an outer cover plate 111 that covers over the optical fiber tailstock 110, and the sleeve section 311 of the first ribbon optical fiber cable 31 is pressed tightly between the optical fiber tailstock 110 and the outer cover plate 111, or otherwise is adhered between the optical fiber tailstock 110 and the outer cover plate 111 by adhesive for the purpose of fixation. Each of the first bare fibers of the first bare fiber section 312 is inserted into the corresponding centering channel 121 and occupies the centering channel 121 partially. The optical fiber tails tock 110 includes a plate 112 and limiting blocks 113 arranged laterally on the side of the plate 112, the plug casing 10 is provided with limiting slots 104 that fit the limiting blocks 113, a positioning pin 114 is arranged on the bottom surface of the outer cover plate 111, and the plug casing 10 is provided with a location hole 105 that fits the positioning pin 114. In the process of assembling, the centering body 12 is mounted in the centering body accommodating cavity 101, the optical fiber tailstock 110 is placed within the plug casing 10 and positioned with the limiting blocks 113 stuck in the limiting slots 104, and then the preprocessed first ribbon optical fiber cable 31 is inserted into the plug casing 10 from the tail end of the plug casing 10, each of the first bare fibers of the first bare fiber section 312 is inserted into the corresponding centering channel 121, and the outer cover plate 112 is placed and positioned with the positioning pin 114 of the outer cover plate 112 inserted into the location hole 105. A step is provided at the front end of the outer cover plate 112, and the step corresponds to and fits a step arranged on the plug casing 10, which may be also used for positioning the outer cover plate 112.

Figure 7:
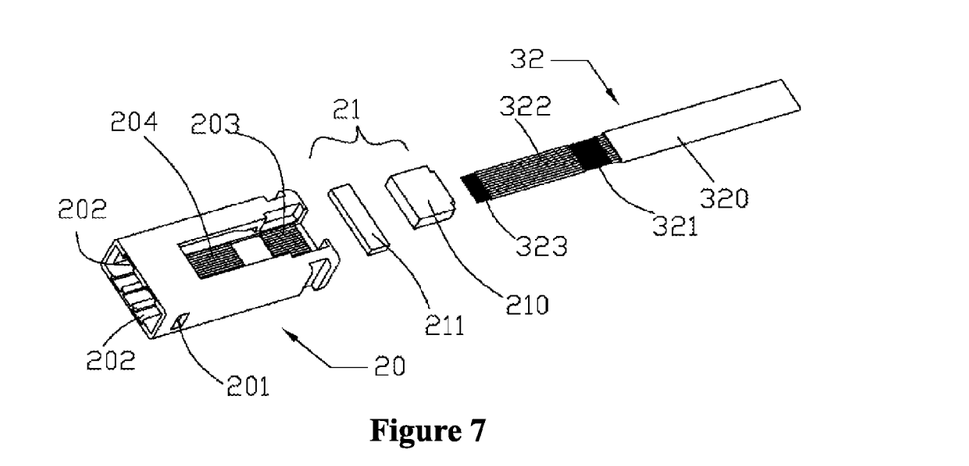
FIG. 7 is an exploded view of a receptacle of the connector for ribbon optical fiber cable according to the first embodiment of the present application.

Elastic hooked tabs 106 are provided on both lateral sides of the plug casing 10 of the plug 1, and engagement recesses 201 matching the hooked tabs 106 are correspondingly arranged on the inner wall of the receptacle casing 20 of the receptacle 2, so that the hooked tabs 106 are caught in the engagement recesses 201 after the plug 1 is inserted into the receptacle 2. In order to ensure the precise mating between the plug 1 and the receptacle 2 as well as the precise alignment of optical fibers at one end with those at the other end, the guiding protrusion 123 at the bottom surface of the centering body precisely mates with the precise mating positioning slot 205 arranged on the inner wall of the receptacle casing; further, in order to guarantee sufficient strength of the mating between the plug and the receptacle to prevent them from lateral shaking relative to each other, multiple ribs 107 are arranged on the surface of the front end of the plug casing 10, and multiple positioning slots 202 are correspondingly provided on the inner wall of the receptacle casing 20.

Figure 8:
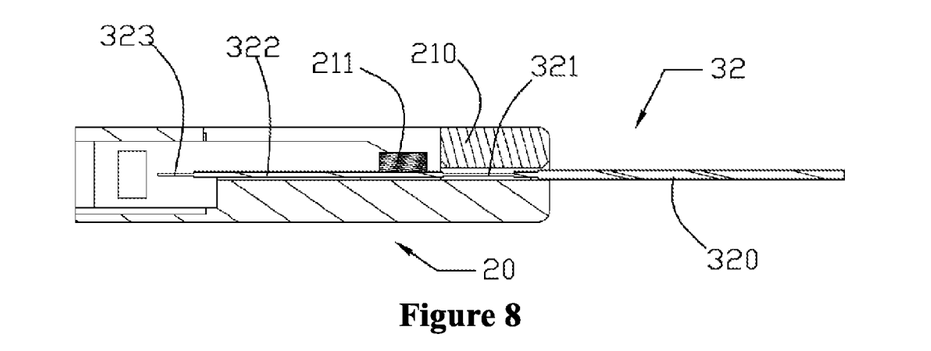
FIG. 8 is a section view of the receptacle of the connector for ribbon optical fiber cable according to the first embodiment of the present application.

FIGS. 7 to 8 are schematic views of the receptacle of the connector for ribbon optical fiber cable according to the first embodiment of the present application, and the receptacle 2 includes a receptacle casing 20, and a second fiber fixation assembly 21 accommodated in the receptacle casing 20. A second ribbon optical fiber cable 32 is inserted into the receptacle casing 20 through the tail end of the receptacle casing 20 and fixed by the second fiber fixation assembly 21. The second ribbon optical fiber cable 32 may include a cladding section 320 with cladding, a fixed-length bare fiber section 321 for fixing the second ribbon optical fiber cable 32, a sleeve section 322 where the cladding is stripped off, and a second bare fiber section 323 which is the head of the second ribbon optical fiber cable and includes multiple second bare fibers.

The second fiber fixation assembly 21 includes a fiber clipping plate 210, V-shaped fiber fixation slots 203 are provided at the tail end of the receptacle casing 20, and the fiber clipping plate 210 may be placed over the V-shaped fiber fixation slots 203. The fixed-length bare fiber section 321 is arranged in the V-shaped fiber fixation slots 203, and adhesive is added to the V-shaped fiber fixation slots 203, thus the fixed-length bare fiber section 321 is attached in the V-shaped fiber fixation slots 203 by adhesive through the fiber clipping plate 210. The second fiber fixation assembly 21 also includes a fiber shaping and clipping sheet 211, which is arranged in the receptacle casing 20 in front of the fiber clipping plate 210 and is used to press the sleeve section 322 of the second ribbon optical fiber cable 32 onto the bottom of the receptacle casing 20, for shaping and positioning of the second ribbon optical fiber cable 32. V-shaped fiber arranging slots 204 are arranged at the bottom of the receptacle casing 20, and the second ribbon optical fiber cable 32 may extend forward along the V-shaped fiber arranging slots 24, with the second bare fiber section 323 being suspended at the front end of the receptacle casing 20. When the plug 1 is inserted into the receptacle 2, the second bare fibers of the second bare fiber section 323 are inserted into the respective centering channels 121 of the centering body 12, so that end faces of the second bare fibers abut on those of the first bare fibers in the centering channels 121. The first and second bare fibers are slightly bent and deformed when they are aligned with each other, so that the end faces of the first and second bare fibers abut on each other with pressure, to secure excellent conduction of optical paths. Since neither of the first bare fibers and the second bare fibers are fixed in the centering body, the abutting connections between the first and second bare fibers are movable.

Figure 9:
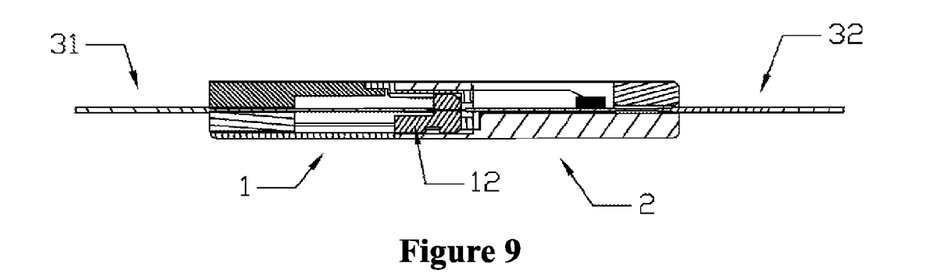
FIG. 9 is a section view of the connector for ribbon optical fiber cable according to the first embodiment of the present application, when the plug is inserted into the receptacle.
Figure 10:
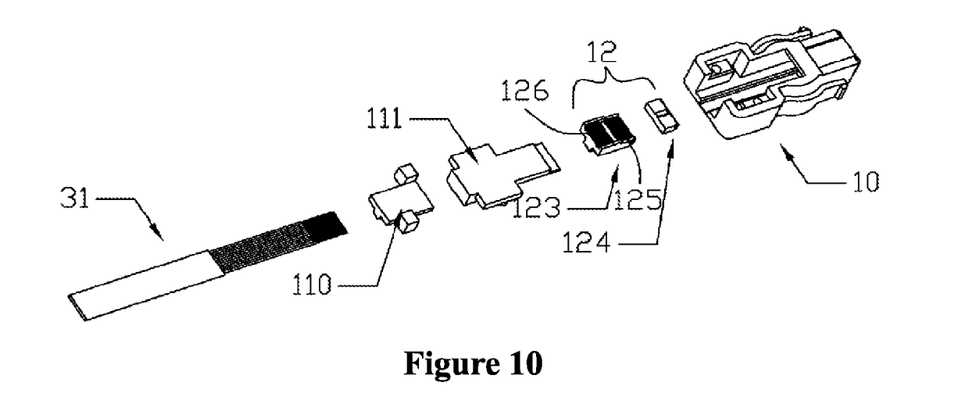
FIG. 10 is a schematic exploded view of a plug of the connector for ribbon optical fiber cable according to a second embodiment of the present application.
Figure 11:
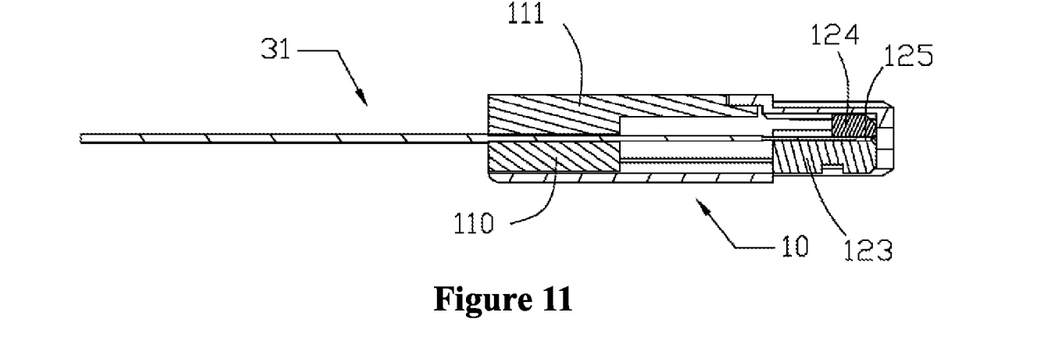
FIG. 11 is a section view of the plug of the connector for ribbon optical fiber cable according to the second embodiment of the present application.
Figure 12:
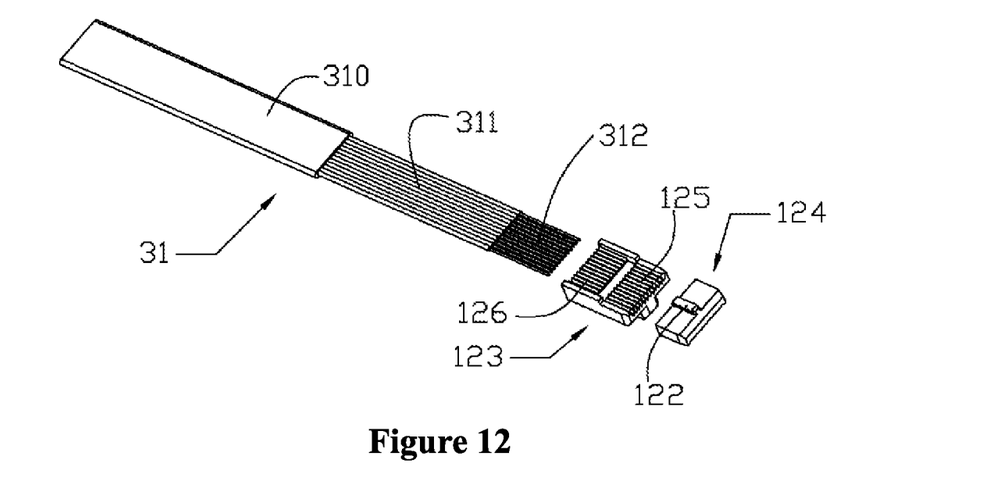
FIG. 12 is a schematic exploded view of the connection between a first ribbon optical fiber cable and the centering body in the connector for ribbon optical fiber cable according to the second embodiment of the present application.
Figure 13:
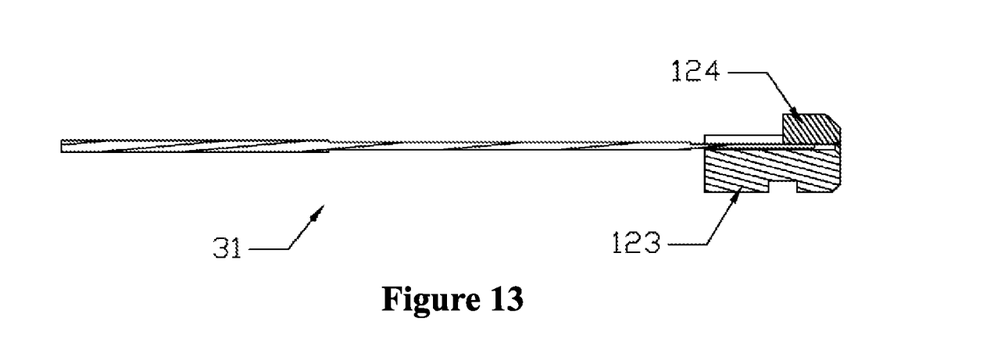
FIG. 13 is section view of the connection between the first ribbon optical fiber cable and the centering body of the connector for ribbon optical fiber cable according to the second embodiment of the present application.

FIG. 9 shows a section view of the connector for ribbon optical fiber cable according to the first embodiment of the present application, where the plug 1 and the receptacle 2 are engaged. As shown, the end faces of the first bare fibers abut on those of the second bare fibers in the centering channel 121 of the centering body 12, to accomplish the relay of the optical paths.

FIGS. 10 to 13 are schematic views of the plug of the connector for ribbon optical fiber cable according to a second embodiment of the present application. It is very difficult to form the centering channels by making through holes in the centering body 12 due to the diameter of the bare fiber which is as small as 125 micron. Therefore, in order to facilitate the production of the centering body 12, the centering body 12 in the present embodiment is divided into two parts, i.e. a base with V-grooves 123 and a cover plate with V-grooves 124 for covering the base, in this case, the manufacture of the V-grooves are much easier than making through holes. The base with V-grooves 123 includes V-shaped centering slots 125 and V-shaped arranging slots 126, the V-shaped centering slots 125 are used for forming the centering channels and are covered by the cover plate with V-grooves 124, but the V-shaped arranging slots 126 are exposed. The first bare fiber section 312 of the first ribbon optical fiber cable 31 is placed from the above into the V-grooves of the base 123, and the fibers are pre-fixed in the V-shaped arranging slots 126 with adhesive. In order to facilitate the inserting of the second bare fibers into the V-shaped centering slots, chamfers for guiding are provided at the fiber inserting end of the V-shaped centering slots 125 that faces the receptacle. Other structural features of the plug 1 in the present embodiment are the same as those in the first embodiment, and thus will not be further described. The structure of the receptacle in the present embodiment is the same as that in the first embodiment.

Figure 14:
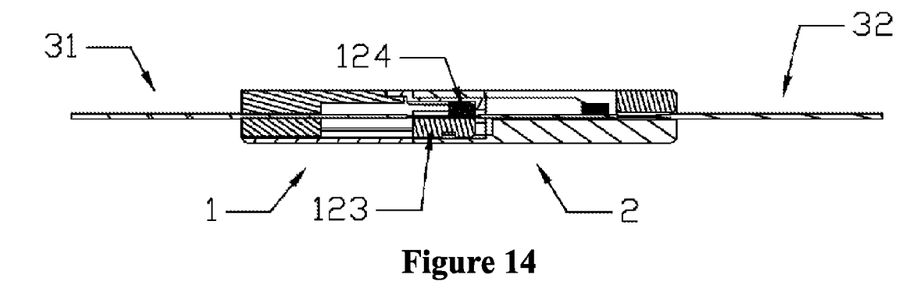
FIG. 14 is a section view of the connector for ribbon optical fiber cable according to the second embodiment of the present application, when the plug is inserted into the receptacle.

FIG. 14 is a section view of the connector for ribbon optical fiber cable according to the second embodiment of the present application, when the plug 1 is inserted into the receptacle 2. As shown, the end faces of the first bare fibers abut on those of the second bare fibers in the V-shaped centering slots 125 of the base with V-grooves 123 of the centering body 12, to accomplish the relay of the optical paths.

Figure 15:
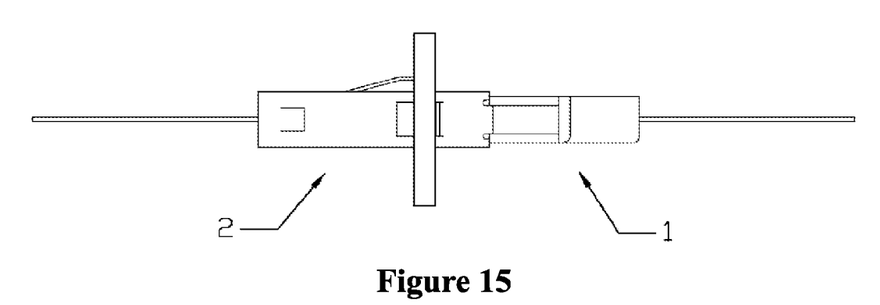
FIG. 15 is a schematic view of the connector for ribbon optical fiber cable in an application state.
Figure 16:
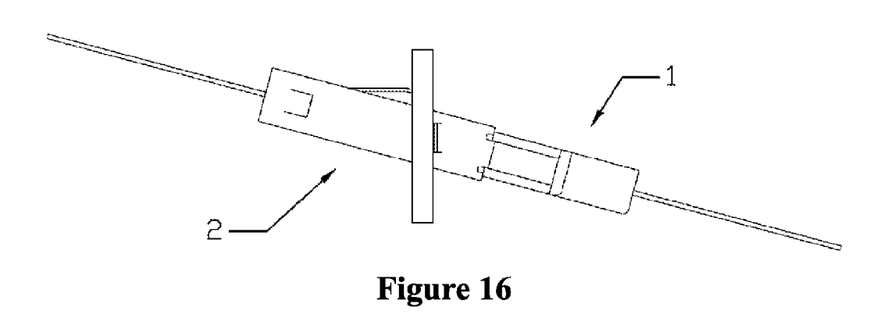
FIG. 16 is a schematic view of the connector for ribbon optical fiber cable in another application state.

FIGS. 15 and 16 illustrated two applications of the connector for ribbon optical fiber cable of the present application, respectively. In FIG. 15, the connector for ribbon optical fiber cable is perpendicular to a panel, while in FIG. 16, the connector for ribbon optical fiber cable is at an angle relative to the panel. The connector for ribbon optical fiber cable of the present application possesses good adaptability, and may be adapted to various applications.

The inventive connector for ribbon optical fiber cable includes a plug and a receptacle, and a centering body containing multiple centering channels is accommodated in the front end of the plug casing. When the plug is inserted into the receptacle, the end faces of the first bare fibers at the front end of the first ribbon optical fiber cable abut on the end faces of the second bare fibers at the front end of the second ribbon optical fiber cable in the centering channels. The connector for ribbon optical fiber cable of the present application is advantageous for its simple structure, easy usage and repeatable inserting and plugging.

The embodiments of the invention are described above with reference to appending drawings. However, the invention is not limited to the above embodiments, which are exemplary instead of restrictive, various modifications and alternatives can be made by those skilled in the art with the enlightenment of the invention without departing from the principle of the invention and the scope of the claims, and these modifications and alternatives fall within the scope of the invention.

The invention claimed is:

1. A connector for ribbon optical fiber cable comprising a plug and a receptacle, wherein, the plug is detachably connected to the receptacle through hooked tabs provided on both lateral sides of a front end of the plug, and a centering body, which allows first and second ribbon optical fiber cable portions of the plug and the receptacle, respectively, to be movably centered with each other inside the centering body, is provided at the front end of the plug;

the plug comprises: a plug casing; and a first fiber fixation assembly and the centering body accommodated in the plug casing, where the centering body is provided with multiple centering channels; a centering body accommodating cavity for receiving the centering body is provided at a front end of the plug casing, and an opening facing the centering body is provided at a front end face of the plug casing; a first ribbon optical fiber cable is allowed to be inserted into the plug casing from a tail end of the plug casing and fixed by the first fiber fixation assembly, a sleeve of an end of the first ribbon optical fiber cable is stripped off to expose multiple first bare fibers, and each of the first bare fibers is inserted into a corresponding one of the centering channels; the receptacle includes a receptacle casing and a second fiber fixation assembly accommodated in the receptacle casing; a second ribbon optical fiber cable is allowed to be inserted into the receptacle casing from a tail end of the receptacle casing and fixed by the second fiber fixation assembly; a sleeve of an end of the second ribbon optical fiber cable is stripped off to expose multiple second bare fibers, and when the plug is inserted into the receptacle, each of the second bare fibers is inserted into a corresponding one of the centering channels, so that an end face of the first bare fiber abuts on that of the second bare fiber;

the centering body is a ceramic body, the centering channels are through holes arranged in the ceramic body, and chamfers are provided at both ends of the through holes;

the centering body includes a base with V-grooves and a cover plate with V-grooves for covering the base, multiple parallel V-shaped centering slots forming the centering channels are arranged on the base, and a chamfer is arranged on at least one end of the V-shaped centering slot.

2. The connector of claim 1, wherein, V-shaped arranging slots are provided on the base with V-grooves, and the first bare fibers extend into the centering V-grooves through the V-shaped arranging slots.

3. The connector of claim 1, wherein, guiding protrusions are provided on both top and bottom surfaces of the centering body, and corresponding guide slots are arranged on inner wall of the centering body accommodating cavity of the plug casing.

4. The connector of claim 1, wherein, the first fiber fixation assembly includes an optical fiber tailstock and an outer cover plate that covers over the optical fiber tailstock, the first ribbon optical fiber cable is pressed tightly between the optical fiber tailstock and the outer cover plate, and the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

5. The connector of claim 4, wherein, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

6. The connector of claim 4, wherein, the second fiber fixation assembly also includes a fiber shaping and clipping sheet, which is arranged in the receptacle casing in front of the fiber clipping plate, and is used to press the second ribbon optical fiber cable on the bottom of the receptacle casing.

7. The connector of claim 6, wherein, V-shaped arranging slots for optical fibers are arranged at the bottom of the receptacle casing, and the second bare fiber is suspended in the receptacle casing.

8. The connector of claim 1, wherein, the first fiber fixation assembly includes an optical fiber tailstock and an outer cover plate that covers over the optical fiber tailstock, the first ribbon optical fiber cable is pressed tightly between the optical fiber tailstock and the outer cover plate, and the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

9. The connector of claim 8, wherein, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

10. The connector of claim 8, wherein, the second fiber fixation assembly also includes a fiber shaping and clipping sheet, which is arranged in the receptacle casing in front of the fiber clipping plate, and is used to press the second ribbon optical fiber cable on the bottom of the receptacle casing.

11. The connector of claim 8, wherein, V-shaped arranging slots for optical fibers are arranged at the bottom of the receptacle casing, and the second bare fiber is suspended in the receptacle casing.

12. The connector of claim 1, wherein, the first fiber fixation assembly includes an optical fiber tailstock and an outer cover plate that covers over the optical fiber tailstock, the first ribbon optical fiber cable is pressed tightly between the optical fiber tailstock and the outer cover plate, and the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

13. The connector of claim 12, wherein, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

14. The connector of claim 12, wherein, the second fiber fixation assembly also includes a fiber shaping and clipping sheet, which is arranged in the receptacle casing in front of the fiber clipping plate, and is used to press the second ribbon optical fiber cable on the bottom of the receptacle casing.

15. The connector of claim 12, wherein, V-shaped arranging slots for optical fibers are arranged at the bottom of the receptacle casing, and the second bare fiber is suspended in the receptacle casing.

16. The connector of claim 2, wherein, the first fiber fixation assembly includes an optical fiber tailstock and an outer cover plate that covers over the optical fiber tailstock, the first ribbon optical fiber cable is pressed tightly between the optical fiber tailstock and the outer cover plate, and the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

17. The connector of claim 16, wherein, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

18. The connector of claim 16 wherein, the second fiber fixation assembly also includes a fiber shaping and clipping sheet, which is arranged in the receptacle casing in front of the fiber clipping plate, and is used to press the second ribbon optical fiber cable on the bottom of the receptacle casing.

19. The connector of claim 16, wherein, V-shaped arranging slots for optical fibers are arranged at the bottom of the receptacle casing, and the second bare fiber is suspended in the receptacle casing.

20. The connector of claim 3, wherein, the first fiber fixation assembly includes an optical fiber tailstock and an outer cover plate that covers over the optical fiber tailstock, the first ribbon optical fiber cable is pressed tightly between the optical fiber tailstock and the outer cover plate, and the second fiber fixation assembly includes a fiber clipping plate, V-shaped fiber fixation slots are provided at the tail end of the receptacle casing, the fiber clipping plate is used to be placed over the V-shaped fiber fixation slots, the second ribbon optical fiber cable includes a fixed-length bare fiber section to be fixed in the V-shaped fiber fixation slots, and the fiber clipping plate is used to press the fixed-length bare fiber section in the V-shaped fiber fixation slots.

21. The connector of claim 20, wherein, the optical fiber tailstock includes a plate and a limiting block arranged on the side of the plate, the plug casing is provided with a limiting slot that fits the limiting block, a positioning pin is arranged on the bottom surface of the outer cover plate, and the plug casing is provided with a location hole that fits the positioning pin.

22. The connector of claim 20, wherein, the second fiber fixation assembly also includes a fiber shaping and clipping sheet, which is arranged in the receptacle casing in front of the fiber clipping plate, and is used to press the second ribbon optical fiber cable on the bottom of the receptacle casing.

23. The connector of claim 20, wherein, V-shaped arranging slots for optical fibers are arranged at the bottom of the receptacle casing, and the second bare fiber is suspended in the receptacle casing.

* * * * *